Patented Jan. 13, 1948

2,434,605

UNITED STATES PATENT OFFICE 2,434,605

METHOD FOR CONSOLIDATING FORMATIONS

Gilbert G. Wrightsman, Houston, Tex., assignor to Standard Oil Development Company, a corporation of Delaware No Drawing. Application March 8, 1943, Serial No. 478,471

1 Claim. (Cl. 166—22)

The present invention is directed to a method for consolidating loose and unconsolidated formations, such as sand and more particularly to a method for consolidating subterranean formations penetrated by a bore hole.

It is often desirable to consolidate loose or incompetent formations without rendering them impermeable. As a specific example the petroleum producing formations penetrated by a bore hole are often of such a nature that when fluid flows into the open hole it carries with it substantial amounts of the grains or particles comprising the formation. Heretofore efforts have been made to prevent the shifting or carrying of loose formations into the bore of the well by arranging a screen or filter in the bore hole adjacent the producing formation. Various types of filters or screens have been employed such as metallic screen, gravel packs or tubular concrete screens rendered porous by acid treatment. Each of these conventional methods, however, suffers from disadvantages well known to those skilled in the art.

It is an object of the present invention to devise a method for consolidating loose formations without greatly reducing the permeability of the formations. More particularly, it is an object of the present invention to devise a method for consolidating loose and incompetent fluid producing formations while leaving interstices therein whereby fluid may flow from the producing formation into the bore of the well, while at the same time shifting of the formation or the carrying of solid particles from the formation into the bore hole is substantially prevented.

According to my invention there is introduced into the formation to be treated a liquid composition capable of reacting to produce a solid and a gas. The solid acts to bind together the loose grains and particles comprising the formation, while the gas produced occupies interstices in the formation which act as channels for flow of fluid through the formation.

The reaction mixture should have certain characteristics in order that it be used in the practice of the present invention. One of these characteristics is that the reaction be sufficiently delayed to allow ample time for the placing of the mixture within the selected formation. Another characteristic is that the solid resulting from the reaction product should have a higher melting point than the temperature of the formation in which it is to be placed.

It is also most desirable that the products of the reaction occupy at least as great a volume under the temperature and pressure conditions of the formation in which it is placed as does the composition introduced therein and it is preferable that it occupy a greater volume. To this end the gas resulting from the reaction should have high critical constants and the solid resulting should have a relatively large volume with respect to the volume of the reaction mixture.

In the preferred embodiment for practicing the present invention wherein the volume of the solid reaction product and the gas under the temperature and pressure conditions occupies a substantially greater volume than does the reaction mixture introduced into the formation, the gas fills interstices in the loose or unconsolidated formation and displaces the reaction mixture further into the sands as the reaction proceeds, leaving interstices throughout the volume occupied by the reaction mixture which are capable of serving as channels of flow. Accordingly, the loose formation is bound together by the solid reaction product while the channels maintained in the formation by the gas prevent any appreciable decrease in the permeability of the formation.

While, as stated above, it is preferred that the reaction products occupy a greater volume under the temperature and pressure conditions in the formation than does the liquid mixture introduced therein, it is possible to employ compositions capable of reacting to produce a solid component and a gaseous component wherein the volume of the reaction product is only equal to or even less than the volume of the composition introduced and still retain some of the advantages of the present invention. It is an essential feature of the present invention that the reaction mixture produce a gas for occupying interstices in the formation and a solid product binding together the particles or grains of the formation to retain them in position so that after the treatment is complete flow may be initiated from the fluid producing formation into the bore hole with the fluid passing through the channels of flow and the solid binding material preventing solid particles from being carried to the bore of the well by the fluid flowing through the formation.

It will be evident that a large number of compositions are available which may be introduced into a bore hole and will react to release a gas of high critical constants and a solid reaction product. It has been found generally that reactions capable of producing a gas such as hydrogen sulfide, ammonia or carbon dioxide and an organic compound are particularly suitable.

Specific examples illustrating suitable reactions are as follows:

*Example I*

Aniline+carbon bisulfide→thiocarbanilide+H₂S

A suitable mixture of ingredients to be introduced into the bore hole may be made up of 55 volumes of aniline mixed with 44.5 volumes of carbon disulfide in which 0.5 volumes of sulphur have been dissolved.

*Example II*

(Thio-amide) + (Water) ⟶

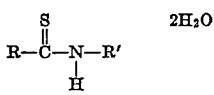

2H₂O (Acid) + (Hydrogen Sulfide) + (Amine)
RCOOH         H₂S              NH₂R′

R and R′ may be an aromatic or a substituted aromatic radical such as benzene, naphthalene, anthracene or a halogen substituted aromatic, that is, with the aromatic ring substituted with halogens, chlorine, bromine or iodine or with a nitro group.

It is preferred to carry out the above reaction in the presence of Ca(OH)₂ to obtain greater effectiveness.

*Example III*

(Dicyanogen) + (Water) + (Lime Water) ⟶
  (CN)₂         2H₂O        Ca(OH)₂

(Calcium Oxalate) + (Ammonia)
   (CO₂)₂Ca              2NH₃

It has been found that in the treatment of porous formations customarily encountered that 0.25 barrels of fluid per foot thickness of sand will give a penetration of 1′ from a 6″ bore hole. If, for example, 10′ of sand section is to be treated then 2.5 barrels of compound will be required.

A preferred mixture would be one made up of 55 volumes of aniline, 44.5 volumes of carbon disulfide in which 0.5 volumes of sulphur is dissolved to make up the required volume.

The amount of reaction mixture introduced into the formation to be consolidated is, of course, dependent upon the penetration desired and the thickness of the sand. It has been found in practicing the present invention that a penetration of one foot from the bore of the well by the reaction mixture gives satisfactory results. If the bore hole is six inches in diameter this penetration may be obtained by employing 0.25 barrels of reacting liquid per foot thickness of sand. If, for example, ten feet of sand section is to be treated then 2.5 barrels of the composition must be introduced into the formation.

While I have given specific examples relating to the practice of the present invention, it will be understood that the examples are given by way of illustration only and not by limitation. The invention has been found particularly suitable for consolidating petroleum producing formations without substantially diminishing the rate of production of such formation, but it will be understood that it is broadly applicable to the treatment of any loose and unconsolidated formation to bind together particles of the formation while maintaining a substantial permeability therein.

Having fully described the present invention, what I desire to claim is:

A method for consolidating an incompetent formation penetrated by a borehole comprising the steps of introducing into the borehole a liquid composition comprising aniline and carbon bisulfide which will form a solid reaction product and a gaseous reaction product under the temperature and pressure conditions of the formation by a single delayed action, the combined volume of the solid product and gaseous product being greater than the volume of the liquid composition introduced, forcing said liquid composition into said formation and retaining it in the formation until solid reaction product and gaseous reaction product have been deposited therein.

GILBERT G. WRIGHTSMAN.

REFERENCES CITED

The following references are of record in the file of this patent:

UNITED STATES PATENTS

| Number | Name | Date |
| --- | --- | --- |
| 2,288,556 | Vollmer | June 30, 1942 |
| 2,274,940 | Stoddard | Mar. 3, 1942 |
| Re. 21,916 | Vietti | Sept. 30, 1941 |
| 2,035,719 | Pitzer | Mar. 31, 1936 |
| 2,240,622 | Lawson | May 6, 1941 |
| 2,345,611 | Lerch | Apr. 4, 1944 |